(12) United States Patent
Raghunandan

(10) Patent No.: US 8,156,370 B2
(45) Date of Patent: Apr. 10, 2012

(54) COMPUTER SYSTEM AND METHOD OF CONTROL THEREOF

(75) Inventor: Meera K Raghunandan, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/520,542

(22) PCT Filed: Dec. 11, 2007

(86) PCT No.: PCT/IN2007/000587
§ 371 (c)(1),
(2), (4) Date: Jun. 22, 2009

(87) PCT Pub. No.: WO2008/078334
PCT Pub. Date: Jul. 3, 2008

(65) Prior Publication Data
US 2010/0268983 A1 Oct. 21, 2010

(30) Foreign Application Priority Data
Dec. 22, 2006 (IN) .......................... 2389/CHE/2006

(51) Int. Cl.
*G06F 11/00* (2006.01)
(52) U.S. Cl. .............................................. 714/10; 714/3
(58) Field of Classification Search ............. 714/2, 3, 714/10, 11, 12, 13
See application file for complete search history.

(56) References Cited

U.S. PATENT DOCUMENTS

| | | | |
|---|---|---|---|
| 4,843,541 A * | 6/1989 | Bean et al. | 710/36 |
| 6,199,179 B1 | 3/2001 | Kauffman et al. | |
| 6,292,905 B1 * | 9/2001 | Wallach et al. | 714/4.12 |
| 6,473,655 B1 | 10/2002 | Gould et al. | |
| 6,647,508 B2 * | 11/2003 | Zalewski et al. | 714/3 |
| 7,117,388 B2 * | 10/2006 | Arimilli et al. | 714/10 |
| 7,543,182 B2 * | 6/2009 | Branda et al. | 714/15 |
| 7,694,303 B2 * | 4/2010 | Hahn et al. | 714/3 |
| 2004/0088692 A1 | 5/2004 | Stutton et al. | |
| 2006/0010450 A1 | 1/2006 | Culter | |
| 2007/0028244 A1 | 2/2007 | Landis et al. | |
| 2007/0067435 A1 * | 3/2007 | Landis et al. | 709/224 |

OTHER PUBLICATIONS

"Installing and Managing HP-UX Virtual Partitions (vPars)", First Edition, Nov. 2001, T1335-90001 (vPars version B.01.00 on HP-UX), 136 pages.

* cited by examiner

*Primary Examiner* — Robert Beausoliel, Jr.
*Assistant Examiner* — Joseph D Manoskey

(57) ABSTRACT

A computer system is described having a plurality of hardware resources, a plurality of virtual partitions having allocated thereto some of those of hardware resources or parts thereof, said virtual partitions having an operating system loaded thereon, a partition monitoring application layer, which is capable of determining whether one or more of the partitions has failed, wherein said partition monitoring application layer also includes at least one hardware resource diagnostic function which is capable of interrogating at least one of the hardware resources allocated to a partition after failure of said partition, and a hardware resource reallocation function which is triggered when the hardware diagnostic function determines that one or more particular hardware resources associated with a failed partition is healthy, and which reallocates that healthy resource to an alternate healthy partition. A method of reallocating such hardware resources is also disclosed.

20 Claims, 4 Drawing Sheets

COMPUTER SYSTEM AND METHOD OF CONTROL THEREOF

BACKGROUND OF THE INVENTION

The concept of partitioning a server is well known to increase resource utilization, such resources being most typically processors and memory but also extending to include storage devices. One partitioning solution employed by the applicant herefor is to provide a plurality of virtual partitions or "vPars" whereby system hardware may be carved up into a variety of different combinations, including parts of processors, network cards, storage adapters without regard for any underlying hardware boundary or other physical relationship. The vpars system is described in "Installing and Managing HP-UX Virtual Partitions (vPars)", First Edition, November 2001, T1335-90001 (vPars version B.01.00 on HP-UX).

As an example, in a server provided with virtual partitions, one instance of an operating system (O/S) is provided on each virtual partition. In order that the server boots up correctly, an additional layer of software between the operating system and the firmware, known as a virtual partition monitor, is provided which effectively creates, launches, reboots, requests resources for, and monitors, at least to the extent that it is aware when a virtual partition crashes, each virtual partition provided in the server. The virtual partition monitor also allocates a set of hardware resources to partitions created thereby.

US2006/0010450, assigned to the applicant herefor, describes an enhancement to virtual partitioning wherein, in addition to the separate instances of the O/S which exist on each virtual partition, a separate instance of firmware is also provided for each partition so the O/S has a pre-defined firmware interface through which it can communicate with the hardware associated with the particular partition.

Notwithstanding the above, and the known capability of dynamically adding and deleting processing resources from a virtual partition (i.e. without requiring a reboot), known virtual partition configurations are not fault tolerant, and fail irretrievably if one of the hardware components associated with the partition fails.

The techniques to be described herein are concerned with improving the hardware fault tolerance of virtual partition configurations, and also enhancing the utilisation of non-faulty hardware resources associated with one or more partitions provided in a server or other system and on which resources said partitions depend for normal operation.

DETAILED DESCRIPTION OF EMBODIMENTS OF THE INVENTION

Figure 1:
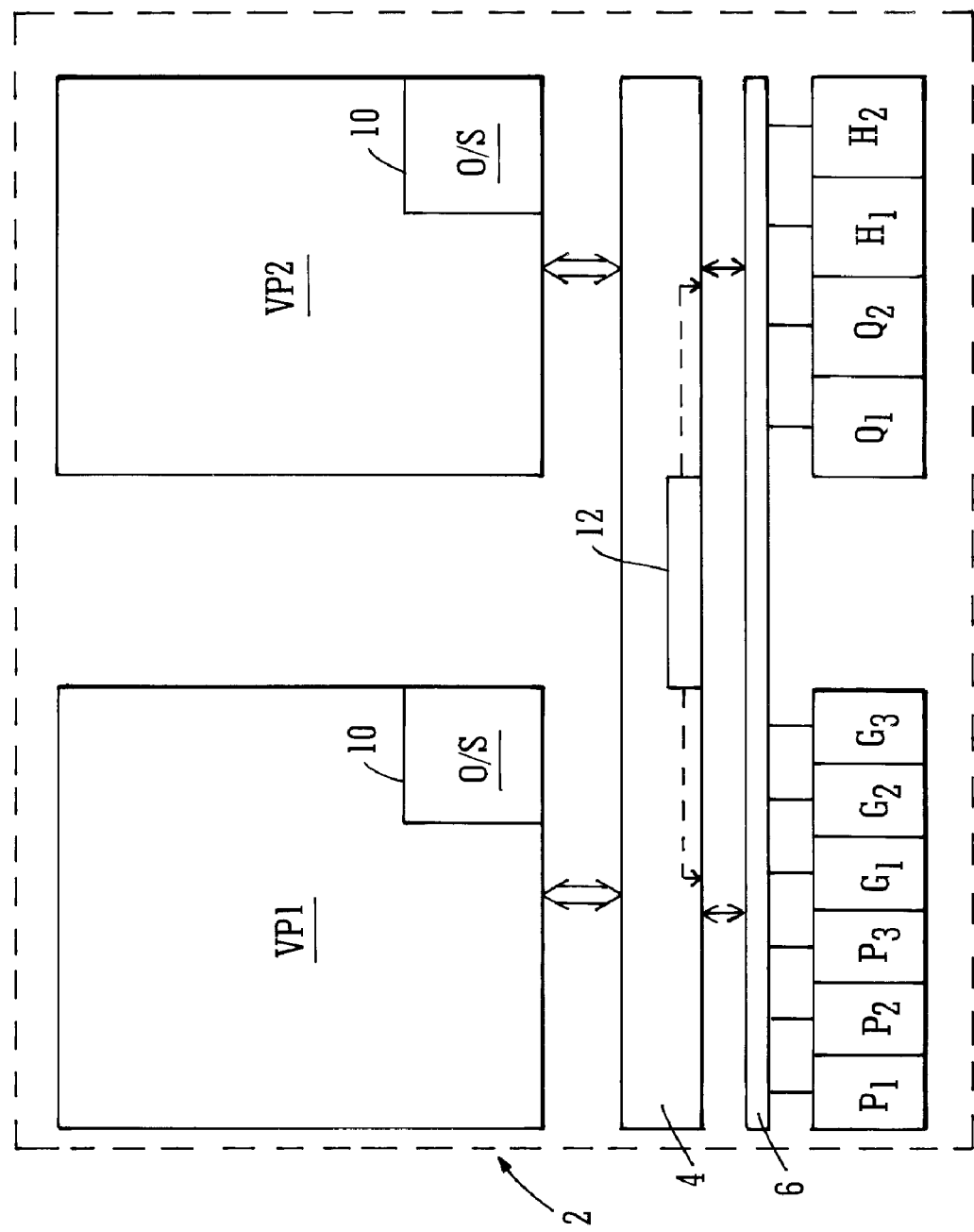
FIG. 1 shows a schematic block diagram of a computer system according to one embodiment of the present invention, and the intercommunication between the various software layers and hardware resources in accordance with the invention.

Referring firstly to FIG. 1, there is shown a computer system indicated generally at 2 in which a pair of virtual partitions VP1, VP2 has been created. Usually, the creation and governance of such partitions will occur at system start or boot under the control of a virtual partition monitor layer 4 which acts a software interface layer between the virtual partitions VP1, VP2, and a firmware layer 6, which latter layer interacts directly with hardware resources P1, P2, P3, G1, G2, G3 allocated to the first virtual partition VP1, and hardware resources Q1, Q2, H1, H2 allocated to the second virtual partition VP2.

Although in the figure the various hardware resources are shown beneath the respective virtual partition to which they have been allocated, in practice, such resources will be arranged in various different locations on one or more motherboard(s) or expansion board(s) of the system, and the allocation performed by the virtual partition monitor merely effects a virtual segregation, such as is schematically represented in FIG. 1.

Under normal operation of the system, the virtual partitions are provided with an individual instance of an O/S 10 which issues instructions and/or data to and receives instructions and/or data from the monitor layer 4 in much the same way as if the O/S 10 were communicating directly with the hardware resources. Within the virtual layer 4 instructions are directed to and from the correct resource, depending on the particular virtual partition from which instructions were received, and the particular hardware resource they are destined for.

In one embodiment, the hardware resources P1, P2, Q1, and Q2 are processors, with P1 and Q1 being considered as monarch-type processors for the respective partition with which they are associated. In common terminology, and in the context of system motherboards often incorporating many processors, monarch processors are responsible for all the initial system boot activity and are usually identified according to their physical motherboard slot location and boot ID. Typically, the processor with the lowest hardware path address (hpa) becomes the monarch, although other arbitration schemes are known.

In the context of virtual partitions, each virtual partition requires a healthy monarch-type processor associated with it for the successful operation thereof, but this processor need not be the monarch processor of the motherboard or of the system in which the virtual partitions are to be created.

P2, and Q2, are secondary or non-monarch-type processors, whereas G1, G2, G3 and H1, H2 are other types of hardware resources, such as memory.

Figure 2:
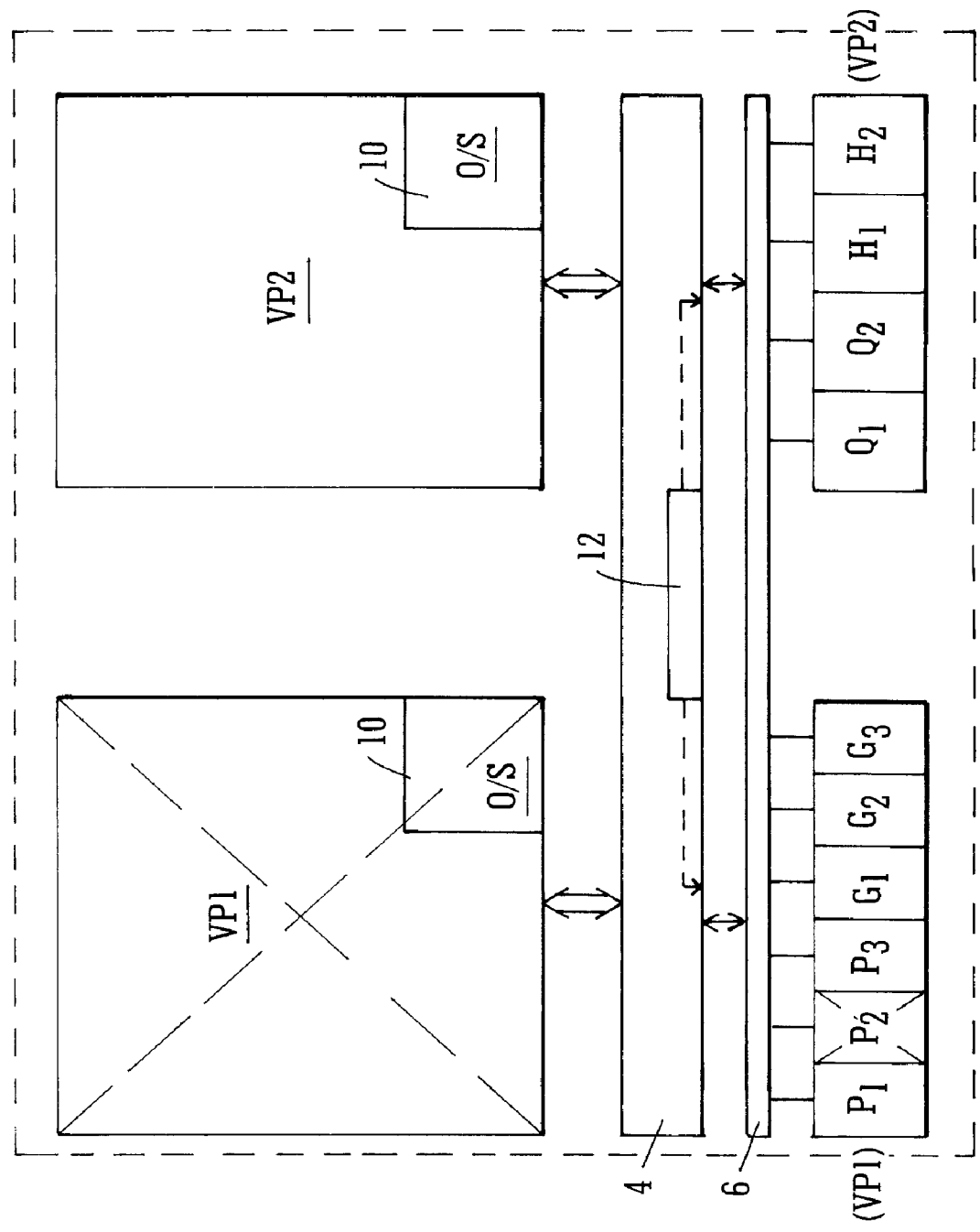
FIG. 2 shows the schematic block diagram of FIG. 1 after a hardware resource failure.

In the first of two possible scenarios, as shown in FIG. 2, P1 fails which causes VP1 to crash fatally. Another potential cause of fatal partition crash is the failure of the partition system disk. As mentioned, P1 is a monarch-type processor for the virtual partition VP1, and therefore the attempt at reboot of this partition also fails. However, as can be seen from the figure, the remaining hardware resources P2, G1, G2, G3 are still healthy despite being disabled by the overall failure of the partition.

The monitor layer 4 detects the failure of VP1, and a hardware diagnosis element 12 embedded in the monitor layer 4 is triggered to interrogate the various hardware resources allocated to the particular partition which has failed. The monitor layer 4 is aware of the failure of VP1 because the failure of the VP1 is handled by the monitor layer 4 itself, which emulates the behavior of the firmware calls that are made by VP1 during its crash path.

In this embodiment, the monitor layer does not form part of either partition VP1 or VP2, and continues to function despite partition failure. In an alternative embodiment, in a multi-partition system comprising two or more partitions, it would be possible for separate monitor layer to be included in at least two of the partitions, as opposed to being a separate software layer in the system. In this case, even if one of the partitions on which the monitor layer is provided fails, then the alternate partition on which it is provided may complete the tasks of detecting partition failure, interrogating the hardware resources allocated to the failed partition, and re-allocating at least one healthy resource allocated to the failed partition to an alternate healthy partition as described below.

Figure 3:
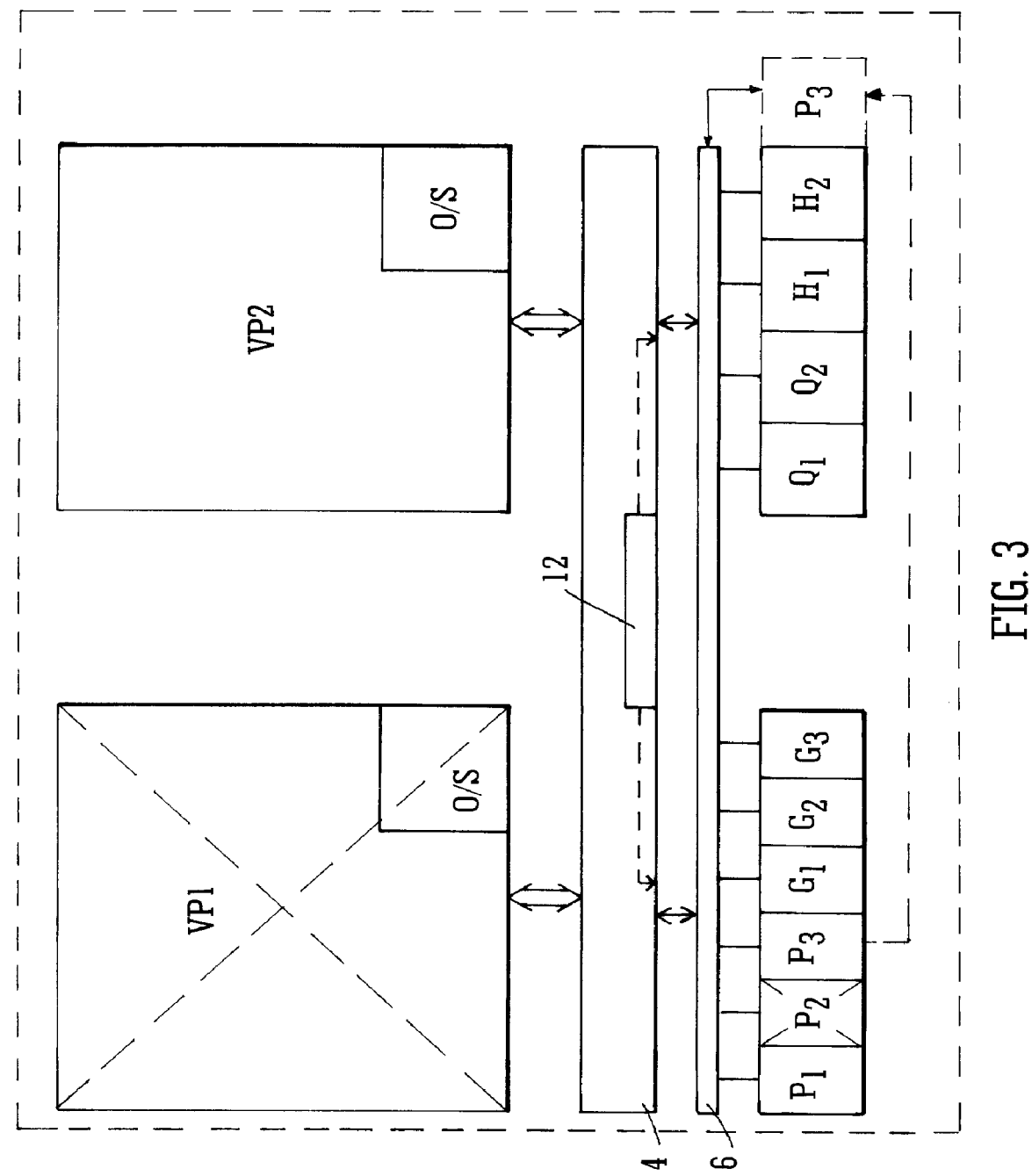
FIG. 3 shows the schematic block diagram of FIGS. 1 and 2 after virtual reallocation of a hardware resource has been accomplished.

Referring to FIG. 3, once the monitor layer 4 having the diagnostic element 12 embedded therein determines that there is a healthy hardware resource which it is possible to re-allocate to a currently live, healthy partition, and it is also determined that the failed partition did not mount successfully after a reboot, then the monitor layer 4 effects a re-allocation of one or more of the healthy hardware resources so that they can be utilized by the healthy partition VP2. In the Figure P2 is shown as being re-allocated, but re-allocation of other resources G1, G2, G3 may also be possible.

Thus it appears to the partition VP2 that it has gained an extra processor P2 to supplement those already allocated, Q1, Q2. As the re-allocation is not instantaneous due the requirement for the monitor layer 4 and diagnostic element 12 to conduct analysis of the hardware resources, the failure of the partition VP1 may result in an increase on the load on VP2. However, this is relatively quickly alleviated by the re-allocation of the processor P2, and may possibly be even further alleviated by the re-allocation of one or more healthy hardware resources G1, G2, G3.

In preferred embodiments, such re-allocation occurs automatically and seamlessly without interruption in the operation of the partition VP2. In particular, it is preferred that the re-allocation of hardware resources is conducted in an on-line manner wherein the re-allocation occurs to an alternate, healthy, running partition without requiring a reboot either of the system or the partition VP2. Ideally, re-allocation occurs only if the failed partition cannot be successfully rebooted after a first failure event, because for successful re-mounting of the partition, all the allocated hardware resources are typically required.

In general, any partition requires at least one monarch-type processor, at least some associated memory, and a basic Input/Output (I/O) function, such being core resources for that partition which are not capable of being re-allocated. In this embodiment therefore, the failure of monarch-type processor P1 automatically renders partition VP1 inutile.

In an alternative scenario (not represented in the Figures), a particular partition may crash non-fatally as a result of the failure of a non-monarch-type processor such as P2, or indeed any of the other hardware resources G1, G2, G3. After any crash, a reboot procedure is conducted, and in certain instances, the partition may be successfully re-booted. In this scenario, the monitor layer 4 may determine which particular hardware resource failed (if indeed any allocated hardware failed), and make a determination as to whether any re-allocation should occur. Ideally however, if re-boot is successful, no automatic migration of allocated hardware resources is performed, because the rebooted partition will generally require all remaining resources to operate correctly.

The monitor layer 4 may also monitor the load/resources of each of the virtual partitions that it has launched, so that the resource re-allocation is effected in a prioritized or pre-determined manner so as to even the loads on the various healthy, live partitions.

Accordingly, in some embodiments a new state for the migrated hardware resources called "temporarily migrated" is introduced. This serves to enable the failed partition to reclaim its originally allocated hardware resources from the monitor layer 4 when the root cause of the problem is isolated, attended to by service personnel, and repaired or replaced.

The re-allocation of resources may be initiated if the partition crashes and does not reboot for a certain amount of time 'x', where 'x' is a value that is dependent on several factors such as configuration of the system, O/S version, etc., then migration of the healthy hardware resources can be commenced with the 'temporarily migrated' flag set. This allows for the eventual reclamation of these devices when the root problem of the partition failure is solved.

In a further embodiment, only processor migration between virtual partitions is permitted, but other resources like memory and Local Bus Adapters may also be re-allocated between virtual partitions. Hence for the illustrated scenario, the diagnostic element 12 may be a processor diagnostic routine. Accordingly, the virtual partition monitor may monitor the health of all the processors in the system. On the event of a crash and subsequent failure to reboot of one the virtual partitions, the monitor layer 4 identifies the healthy processors belonging to the failed partition using the embedded processor diagnostics. The monitor layer 4 then initiates the re-allocation of the healthy processors to the live partitions.

Figure 4:
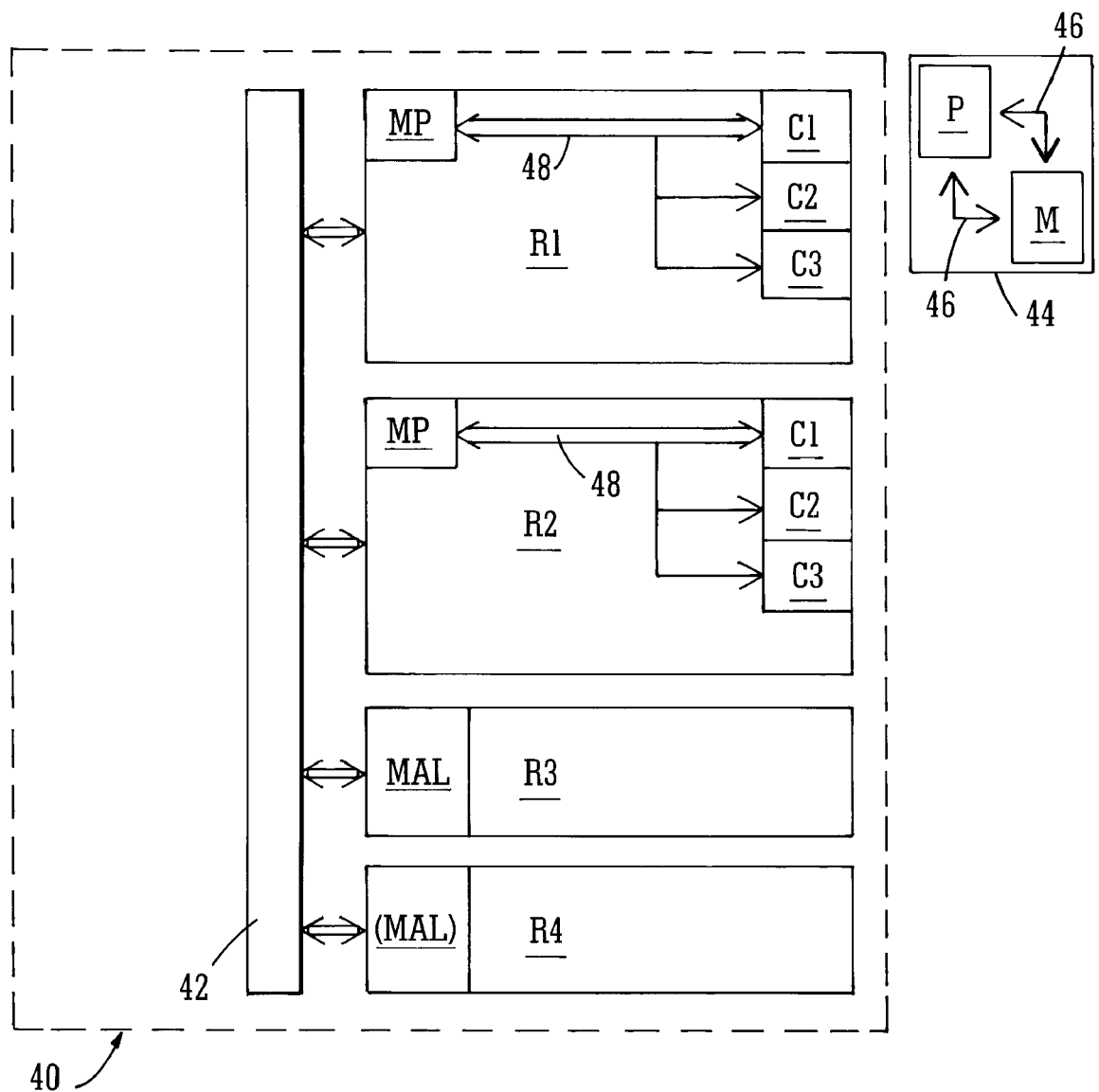
FIG. 4 shows an alternative architecture, in schematic block diagram form, for a system in which the invention can be implemented.

In an alternative embodiment illustrated in FIG. 4, it is possible to define partitions R1, R2, R3, R4 in terms of hardware resource units known as cells C1, C2, C3. In its most basic form, a cell 44 consists of at least one processor P, some memory M and an I/O facility 46 by means of which the processor can communicate with, among other things, the memory and thus be useful. A partition can be defined as being made up of at least one root cell C1, and optionally one or more further floating cells C2, C3. The root cell of a partition cannot generally be re-allocated to an alternate partition, but it is possible to re-allocate the floating cells so that the resources contained therein may be utilised by an alternate healthy partition.

Accordingly, one or more cells of hardware resources may be automatically re-allocated in analogous manner to the first embodiment. For example, after the virtual partition monitor interrogates the failed partition in which such cells reside, and then determines which are healthy and available for reallocation, automatically reallocation of such cells to an alternate healthy partition is carried out.

The partition monitor may take the form of a partition monitor application layer (MAL) which includes the embedded diagnostic capability mentioned above. The partition monitor or MAL may be provided on any partition other than those being monitored (R3, R4), or on another server entirely, and furthermore a master/slave arrangement for the MALs may be provided. For instance, two instances of the MAL may be provided on two separate partitions/servers for redundancy, but at a given time, only one instance of the MAL is a master, and it is this master which monitors the partitions of a multi-partition server. The other instance is a slave, which takes over as the master on the event of crash of the partition/server which hosts the master MAL, before spawning a slave application on another partition/server.

Accordingly in FIG. 4, a system 40, ideally a server, in which the virtual partitions R1, R2, R3, R4 have been created, R1 and R2 are the partitions required to be monitored. A master MAL runs on another non-monitored partition, partition R3, in the same server. A slave (MAL) is also spawned by the master MAL on another partition, Partition R4, for redundancy. The master MAL continuously monitors the two partitions R1 and R2 along the non-partitioned bus or other data transfer resource 42 within the server to check if they are alive. In the event of crash of R4, the master MAL running on R3 identifies another non-monitored partition (not shown), or another server (not shown) for running the slave (MAL). In the event of crash of R3 on which the master MAL is running, the slave (MAL) then becomes the master and spawns a new slave (MAL) on another non-monitored partition/server (not shown).

Each of the cells C1 in the partitions R1, R2 is a root cell, and is fundamental to the operation of the partition in which it is included, or to which it has been "allocated", and therefore this cell cannot be re-allocated. However, it is possible for this cell to fail, and in such circumstances, in prior art systems at least, the various other cells C2, C3 in the partition would automatically be disabled by virtue of the failure of the partition as a whole.

Partitions R1, R2 are monitored by the MAL on R3, In the scenario where R1 crashes and subsequently fails to reboot, R1 will not respond to the master MAL on partition R3. In this case, the MAL connects to a management processor MP provided in R1. Through the MP, and the data transfer pathways 48 which are implicitly included in the partitions, the master MAL launches various diagnostic tools on R1, and in particular the cells C1, C2, C3 thereof to determine their health. Once it is determined that there are one or more healthy floating cells available for re-allocation (not being root cells incapable of being re-allocated), then the MAL effects the re-allocation of these cells to another partition using partition manageability commands. Assuming that in this example, R1C2 fails, as part of the re-allocation process of the remaining healthy, allocatable cell R1C3, an interrupt is sent to partition R2 to add the cell R1C3 to its list of hardware resources. The partition R2 uses commands for online addition of cell R1C3 to itself. The partition R2 now has four cells instead of three, thereby ensuring availability and re-use of R1C3.

The MAL, optionally in combination with other workload management software may determine the loads on the various partitions and distribute the resources based on the load distribution in the various partitions.

With the above-described techniques, hardware resources associated with failed partitions are not disabled by virtue of the failure of the partition with which they are associated. This is possible because although a hardware resource associated with a virtual partition may fail and effectively disable the partition to which it has been allocated, the partition-creating and monitoring software layer remains active as it is not installed on a specific partition but acts as an interface layer between the firmware of the system, and the software or O/S provided on each partition which dictates the operation thereof. Accordingly, despite failure of a partition, the intermediate layer can still perform its required functions of monitoring, hardware resource interrogation, and hardware resource reallocation. By such means, the hardware components that are in working condition can be made available to live partitions, whose performance is thus automatically increased. Additionally, the increased hardware resource utilization contributes to a reduction in overall total cost of ownership (TCO).

It is possible to integrate the resource reallocation features described above with other "high availability" features such as a WLM (work load manager) by migrating work loads from the crashed partition to the ones which have the additional migrated resources.

A yet further advantage can be appreciated when a virtual partition is used as a failover node for another virtual partition within the same server. In the event of a crash of the partition, the load increases on the failover node. By virtue of the invention described above and below, the failover node has additional hardware resources to accommodate increased load.

The invention claimed is:
1. A computer system having
a plurality of hardware resources,
a plurality of virtual partitions each having some of those of hardware resources allocated thereto, said virtual partitions having an operating system loaded thereon,
a partition monitoring application layer, which is capable of determining whether one or more of the partitions has failed,
wherein
said partition monitoring application layer also includes at least one hardware resource diagnostic function which interrogates at least one of the hardware resources allocated to a partition after failure of said partition to determine status of those hardware resources, and
a hardware resource reallocation function which is triggered when the hardware diagnostic function determines that one or more particular hardware resources associated with a failed partition is healthy, and which reallocates that healthy resource to an alternate healthy partition.

2. A system according to claim 1 wherein the hardware resource diagnostic function also determines whether a particular hardware resource is capable of being reallocated.

3. A computer system according to claim 1 wherein the hardware resource diagnostic function is embedded in the partition monitoring application layer.

4. A computer system according to claim 1 wherein the virtual partitions are created on system start up, said partition monitoring application layer additionally performing allocation of the hardware resources to the partitions created.

5. A computer system according to claim 1 wherein the interrogation of hardware resources by the monitoring application layer is effected through firmware.

6. A computer system according to claim 1 wherein the partition monitoring application layer further includes partition manageability commands to enable the re-allocation of hardware resources.

7. A computer system according to claim 1 wherein the hardware resources allocated to a particular virtual partition include at least one monarch processor and one secondary processor, and in the event of failure of the monarch processor, the secondary processor is re-allocated to an alternate virtual partition.

8. A computer system according to claim 1 wherein the hardware resources include one or more memories.

9. A computer system according to claim 1 wherein the hardware resources include one or more Local Bus Adapters.

10. The computer system of claim 1 wherein said partition monitoring application layer is included in at least two of said virtual partitions.

11. The computer system of claim 1 further comprising a flag associated with a hardware resource that has been reallocated from said failed partition to said alternate healthy partition such that said failed partition can reclaim the reallocated hardware resource when said failed partition returns to operation.

12. A method for hardware resource reallocation within a computer system having a plurality of hardware resources, and having been subdivided into a plurality of virtual partitions, each of said partitions having allocated thereto at least one hardware resource or part thereof, said method including the steps of monitoring the various virtual partitions to determine whether one or more has failed on determining the failure of a partition, interrogating at least one of the hardware resources allocated to a failed partition to determine whether that resource remains healthy, and if so, re-allocating said at least one healthy hardware resource to an alternate healthy partition.

13. A method according to claim 12 wherein the re-allocation of the healthy hardware resource occurs under the control of a partition monitoring application layer in which is embedded a hardware resource diagnostic function which interrogates the hardware resources.

14. A method according to claim 13 wherein the step of hardware resource re-allocation is effected by partition management commands included within the partition monitoring application layer.

15. A method according to claim 12 wherein the hardware resource re-allocation occurs in an on-line manner without requiring a reboot of either the system or the healthy partition to which the hardware resource is reallocated.

16. A method according to claim 12 wherein the re-allocation of the healthy hardware resource occurs only after it is determined that the failed partition cannot be rebooted successfully.

17. A method according to claim 12 wherein the re-allocation of the healthy hardware resource occurs immediately on failure of a virtual partition, but the re-allocation occurs in conjunction with the setting of a temporary reallocation flag in the partition monitoring application layer.

18. A non-transitory computer readable medium with a computer program comprising instructions stored thereon, said program comprising instructions for monitoring the state of virtual partitions and hardware resources within a system and interacting with both, said program being executed externally of the partitions being monitored, said program including one or more hardware resource diagnosis functions to enable the re-allocation of one or more healthy hardware resources from a failed partition to a healthy partition on detection that a virtual partition having a plurality of hardware resources allocated thereto has failed.

19. A system in which hardware resources can be re-allocated between multiple virtual partitions provided on said system, said system including means for determining whether one or more of the partitions within the system has failed, means for interrogating the hardware resources allocated to the failed partition to determine whether the particular hardware resource is healthy, means for re-allocating the healthy hardware resource to an alternate healthy partition in the event that the determinations above are made.

20. A system according to claim 19 which further includes means for determining whether a particular hardware resource is capable of being re-allocated to an alternate healthy partition.

* * * * *